Jan. 18, 1927.
J. HAAS, JR
1,615,011
POULTRY BAND
Filed Sept. 5, 1925
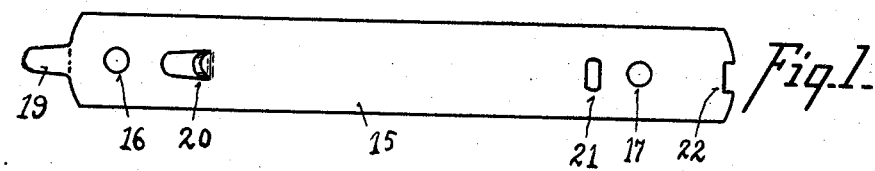
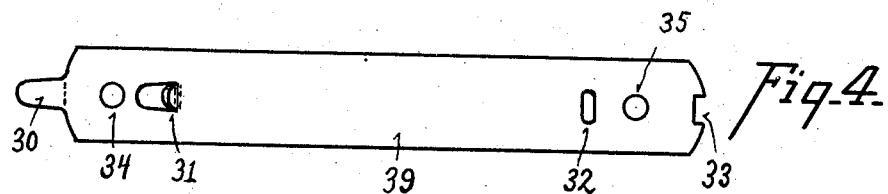
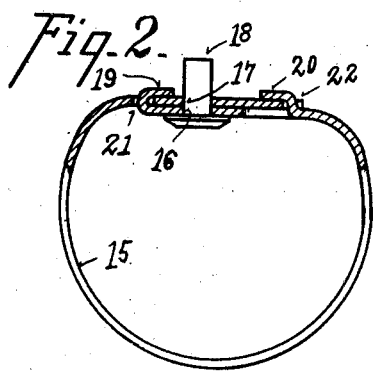
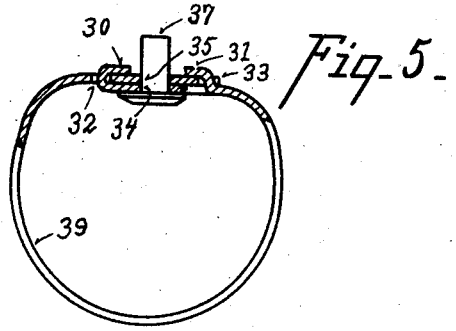
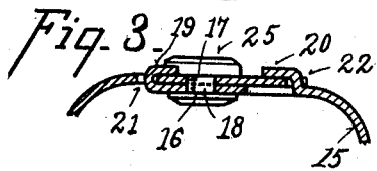
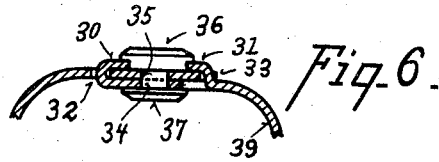
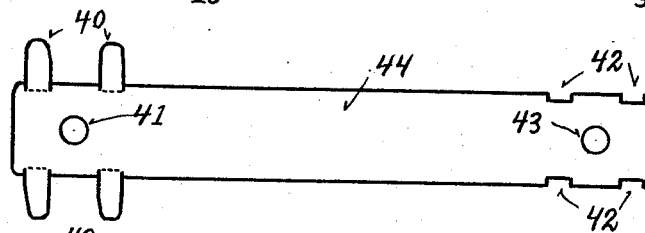
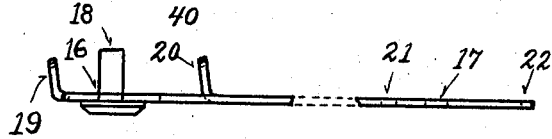
Inventor,
Joseph Haas Jr.,
By C. W. Miles.
Attorney.

Patented Jan. 18, 1927.

1,615,011

UNITED STATES PATENT OFFICE.

JOSEPH HAAS, JR., OF NEWPORT, KENTUCKY.

POULTRY BAND.

Application filed September 5, 1925. Serial No. 54,782.

My invention relates to improvements in poultry band. One of its objects is to provide an improved poultry band the ends of which are adapted to be secured together by means of a rivet, and means to hold the overlapped ends of the band in position against relative movement which would tend to shear or wear the shank of the rivet. Another object is to provide a band having a plurality of stamped interengaging members serving in addition to the rivet to prevent relative movement of the overlapped ends of the band. Another object is to provide an improved band having a stamped tongue and recess to prevent relative movement of the overlapped ends of the band, the end of the tongue being in position to be engaged by one head of the rivet when the rivet is headed to seal the band. My invention also comprises certain details of form and arrangement and combination of components, all of which will be fully set forth in the description of the accompanying drawings, in which:

Fig. 1 is a plan of my improved band as it comes from the stamping dies, upon an enlarged scale.

Fig. 2 is a sectional detail of the band Fig. 1 with its ends overlapped and locked in position by the stamped tongues, ready to seal or head the rivet.

Fig. 3 is a view similar to Fig. 2 showing the rivet sealed or headed upon the overlapped ends of the band.

Fig. 4 is a plan of a flat band showing a modification of Fig. 1.

Fig. 5 is a view similar to Fig. 2 showing the band Fig. 4 held by its stamped tongues and ready to have the rivet sealed.

Fig. 6 is a view similar to Fig. 3 showing the band Fig. 4 with the rivet sealed upon the ends of both stamped tongues.

Fig. 7 is a side elevation of the band Fig. 1 with tongues bent and rivet in place ready to be applied to the leg of a fowl.

Fig. 8 is a plan of a flat blank illustrating a modification of Fig. 1.

The accompanying drawings illustrate the preferred embodiments of my invention. In Figs. 1, 2 and 3 a stamped sheet metal band 15 is provided with perforations 16 and 17 near opposite ends thereof for the passage of the shank of a rivet 18. Tongues 19 and 20 are stamped up from the sheet metal of the band at one end thereof and a perforation 21 and notch or recess 22 are stamped in the opposite end of the blank, said tongues and interengaging recesses and perforations being so positioned relative to the perforations for the rivets that the band may be bent into a loop about the leg of a fowl and the tongue 19 inserted through the perforation 21 while the base of the tongue 20 engages in the recess 22 so as to hold the overlapped ends of the band 15 against lateral or relative movement, thereby preventing any strain from the perforations 16 and 17 upon the shank of the rivet 18 tending to wear or shear the shank of the rivet and thereby sever the rivet and cause the band to become loosened from the fowl, and the identity of the fowl lost.

In practice the bands and rivets are assembled upon the fowls at the commencement of a poultry exhibition substantially as shown in Fig. 2, and are allowed to remain in that condition until after the judges have passed upon the merits of the fowls, whereupon the rivets are sealed or headed over as shown in Fig. 3 to prevent the removal of the bands from such fowls as have received the approval of the judges while the bands upon fowls which have not been approved by the judges may be removed if desired.

As shown in Fig. 3 the free end of the tongue 19 is in position to be engaged by the outer head 25 of the rivet to thereby further lock the tongue 19 in place, while the free end of the tongue 20 is not engaged by the head 25 of the rivet. In the modification Figs. 4, 5 and 6 the tongues 30 and 31 of the band 39 corresponding to the tongues 19 and 20 of Figs. 1, 2 and 3 and the perforation 32 and recess 33 corresponding to the perforation 21 and recess 22 of Fig. 1 are so placed with reference to the rivet perforations 34 and 35 that the free ends of both tongues 30 and 31 are engaged by the head 36 of the rivet 37 as shown in Fig. 6. The rivets employed are preferably made of relatively soft metal adapted to be headed over or sealed by the application thereto of pressure endwise of the rivet by means of a press or lever seal. The metal of the band is preferably harder than that of the rivet, and both adapted to resist corrosion.

In the modification Fig. 8, a plurality of tongues 40 are provided at the sides of the band 44 adjacent to one of the rivet perforations 41, and a plurality of correspondingly arranged recesses 42 adjacent to the rivet perforation 43 at the opposite end of the band, into which recesses the bases of the tongues enter while the free ends of the tongues are bent over upon the face of the overlapped opposite end of the band. The free ends of the respective tongues 40 are preferably in position to be engaged by the head of the rivet in sealing the rivet. The recesses 22, 33 and 42 are preferably employed, but may be modified or omitted if desired. The combined locking and sealing means insures the bands being reliably retained in place under all normal conditions.

The apparatus herein shown and described is capable of considerable modification within the scope of the claims without departing from the spirit of my invention.

What I claim is:

1. A poultry band having rivet perforations near opposite ends, a soft metal rivet adapted to be passed through said perforations and headed to hold the ends of said band together face to face and sealed with an impression to prevent opening of said band without detection, and interengaging members located in a plurality of pairs adjacent to said rivet perforations, said interengaging members being interengaged in pairs and so positioned relative to said soft metal rivet as to prevent relative movement of the overlapped portions of the band and to resist lateral strain in any direction tending to cause the overlapped ends of the band to shear said rivet.

2. A poultry band having rivet perforations near opposite ends, and interengaging members carried by opposite ends of said band tending to prevent relative movement of the overlapped ends of said band, said interengaging members being engaged and locked against displacement by the rivet head when the rivet is sealed.

3. A poultry band having rivet perforations near opposite ends thereof, a soft metal rivet adapted to be passed through said rivet perforations and headed to hold the ends of said band together face to face and sealed with an impression to prevent opening of said band without detection, and a plurality of stamped tongues serving to lock the overlapped ends of the band together independently of said rivet and so related to the overlapped ends of said band and said rivet as to prevent relative movement of the overlapped portions of the band and to resist lateral strain in any direction tending to cause the overlapped ends of the band to shear said rivet.

4. A poultry band having rivet perforations near opposite ends thereof, a soft metal rivet adapted to be passed through said rivet perforations and headed to hold the ends of said band together face to face and sealed with an impression to prevent opening of said band without detection, and interengaging means carried by the overlapped ends of said band to lock the overlapped ends of said band together at a plurality of points of engagement and upon opposite sides of said rivet, said interengaging means being so related to the overlapped ends of said band and to said rivet as to prevent relative movement of the overlapped portions of said band and to resist lateral strain in any direction upon said rivet tending to cause the overlapped ends of the band to shear said rivet.

5. A poultry band having rivet perforations near opposite ends, and interengaging members located in pairs upon opposite sides of the rivet perforations to prevent relative motion of the overlapped ends of the band tending to wear the shank of the rivet, each pair of said interengaging members being locked against displacement by the rivet head when the rivet is sealed.

In testimony whereof I have affixed my signature.

JOSEPH HAAS, Jr.